US011285847B2

(12) United States Patent
Almasi et al.

(10) Patent No.: US 11,285,847 B2
(45) Date of Patent: Mar. 29, 2022

(54) VEHICLE SEATING ASSEMBLY WITH VENTILATED COOLING

(71) Applicant: Ford Global Technologies, LLC, Dearborn, MI (US)

(72) Inventors: Gabriella Almasi, Windsor (CA); William J. Wamsley, Willis, MI (US); Michael Steven Medoro, Livonia, MI (US); Lawrence C. Karas, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 804 days.

(21) Appl. No.: 16/056,121

(22) Filed: Aug. 6, 2018

(65) Prior Publication Data
US 2020/0039396 A1 Feb. 6, 2020

(51) Int. Cl.
*B60N 2/56* (2006.01)
*B60H 1/00* (2006.01)

(52) U.S. Cl.
CPC ....... *B60N 2/5628* (2013.01); *B60H 1/00285* (2013.01); *B60N 2/5642* (2013.01); *B60N 2/5657* (2013.01)

(58) Field of Classification Search
CPC .. B60N 2/5628; B60N 2/5642; B60N 2/5657; B60H 1/00285
USPC ........................................................ 454/120
See application file for complete search history.

(56) References Cited

U.S. PATENT DOCUMENTS

| | | | |
|---|---|---|---|
| 6,079,485 A * | 6/2000 | Esaki ................. | B60H 1/00285 165/42 |
| 7,681,630 B2 | 3/2010 | Klassen et al. | |
| 10,717,340 B2 * | 7/2020 | Jones ................. | B60H 1/00828 |
| 2001/0022222 A1 * | 9/2001 | Aoki ................... | B60N 2/5657 165/203 |
| 2010/0038937 A1 * | 2/2010 | Andersson ............ | B60N 2/565 297/180.14 |
| 2010/0072290 A1 | 3/2010 | Dage | |
| 2012/0202413 A1 * | 8/2012 | Kawashima ....... | B60H 1/00285 454/75 |
| 2013/0140857 A1 * | 6/2013 | Shin ..................... | B60N 2/5657 297/180.13 |
| 2015/0329027 A1 * | 11/2015 | Axakov ................ | B60N 2/565 297/180.13 |

FOREIGN PATENT DOCUMENTS

| | | |
|---|---|---|
| CN | 104108332 A | 10/2014 |
| GB | 2519575 A | 4/2015 |
| WO | WO-2009024226 A2 * | 2/2009 ........... B60N 2/5642 |

OTHER PUBLICATIONS

WO2009024226 English translation and Abstract translation.*

* cited by examiner

*Primary Examiner* — Steven S Anderson, II
(74) *Attorney, Agent, or Firm* — Vichit Chea; Price Heneveld LLP (57) ABSTRACT

A vehicle ventilation system includes a seating assembly including a seat blower. The seat blower pulls air away from a seating surface. A cabin blower is configured to circulate air in a cabin. A controller is configured to monitor a flow rate of the cabin blower. The controller is also configured to control a seat blower flow rate as a function of a cabin blower flow rate.

17 Claims, 7 Drawing Sheets

VEHICLE SEATING ASSEMBLY WITH VENTILATED COOLING

FIELD OF THE DISCLOSURE

The present disclosure generally relates to a vehicle seating assembly, and more particularly to a vehicle seating assembly that regulates seat airflow as a function of cabin airflow.

BACKGROUND OF THE DISCLOSURE

Vehicle seat comfort has become increasingly important as passengers take longer trips. Providing ventilation in the seating assembly can increase the comfort of passengers.

A variety of vehicle seating assemblies that provide for ventilated cooling of an occupant are known. However, current solutions for providing airflow often utilize less cooling capacity than is available. It is desirable to provide a ventilated seating assembly that utilizes available cooling capacity to cool an occupant.

SUMMARY OF THE DISCLOSURE

According to one embodiment of the present disclosure, a vehicle ventilation system includes a seating assembly including a seat blower. The seat blower pulls air away from a seating surface. The vehicle ventilation system also includes a cabin blower configured to circulate air in a cabin and a controller. The controller is configured to monitor a flow rate of the cabin blower. The controller also controls a seat blower flow rate as a function of a cabin blower flow rate.

Embodiments of the first aspect of the disclosure can include any one or a combination of the following features:
- the seat blower cools the seating surface;
- the cabin blower cools at least a portion of the cabin;
- the cabin blower cools the seating surface;
- the seat blower pulls air away from the seating surface through channels in a seat cushion;
- a first vehicle input in communication with the controller, wherein the controller is configured to selectively activate the cabin blower within a first range of cabin blower flow rates or a second range of cabin blower flow rates;
- when the cabin blower is activated within the first or second range of the cabin blower flow rates, then the controller is configured to activate the seat blower within a corresponding and respective first or second range of seat blower flow rates;
- the cabin blower flow rates in the second range of cabin blower flow rates are higher than the cabin blower flow rates in the first range of cabin blower flow rates and wherein the seat blower flow rates in the second range of seat blower flow rates are higher than the seat blower flow rates in the first range of the seat blower flow rates; and/or
- the controller is configured to activate the seat blower in response to a manual input.

According to another embodiment of the present disclosure, a vehicle ventilation system includes a seat heaving a seating surface. A vehicle ventilation system also includes a seat air mover configured to draw air away from the seating surface to cool the seating surface. A cabin air mover is configured to circulate air in a vehicle interior. A vehicle ventilation system also includes a controller. The controller is configured to monitor a flow rate of the cabin air mover. The controller is also configured to control a seat air mover flow rate as a function of a cabin air mover flow rate.

Embodiments of the second aspect of the disclosure can include any one or a combination of the following features:
- the seat air mover is disposed within the seat;
- the seat includes a cushion and wherein the cushion includes one or more airways that deliver air from the seating surface to the seat air mover;
- when the cabin air mover is in a cabin air mover high setting, then the controller activates the seat air mover at a seat air mover high setting;
- the cabin air mover high setting and the seat air mover high setting each include a predefined range of volumetric flow rates;
- the one or more airways comprise one or more channels and wherein each channel comprises a first end disposed at a seating surface and a second end coupled to the seat air mover;
- the one or more airways comprise one or more porous portions of a seat cushion and wherein the one or more porous portions of a seat cushion are disposed between the seating surface and the seat air mover;
- when a cabin air mover volumetric flow rate is at or above a predetermined cabin air mover volumetric flow rate level and a seat air mover volumetric flow rate is at or above a predetermined seat blower volumetric flow rate level, then a predetermined NVH parameter level is achieved in the vehicle interior; and/or
- the predetermined NVH parameter level includes a noise level.

According to a further embodiment of the present disclosure, a method for reducing a seating surface temperature includes the steps of receiving a vehicle status input indicative of a cabin blower operating at a cabin blower input level and comparing the vehicle status input indicative of the cabin blower operating at the cabin blower input level with a predetermined cabin blower level. The method for reducing a seating surface temperature also includes the step of determining whether the cabin blower input level is greater than the predetermined cabin blower level, equal to the predetermined cabin blower level, or less than the predetermined cabin blower level. The method for reducing a seating surface temperature also includes the steps of activating the seat blower at a high setting when the cabin blower input level is greater than the predetermined cabin blower level, activating the seat blower at a low setting when the cabin blower input level is less than or equal to the predetermined cabin blower level, and pulling air proximate the seating surface into airways in a seat cushion to reduce a temperature of the seating surface.

Embodiments of the third aspect of the disclosure can include any one or a combination of the following features:
- achieving a predetermined NVH parameter level when the cabin blower input level is greater than the predetermined cabin blower level and the seat blower is activated at the high setting.

These and other aspects, objects, and features of the present disclosure will be understood and appreciated by those skilled in the art upon studying the following specification, claims, and appended drawings.

DETAILED DESCRIPTION

Figure 1:
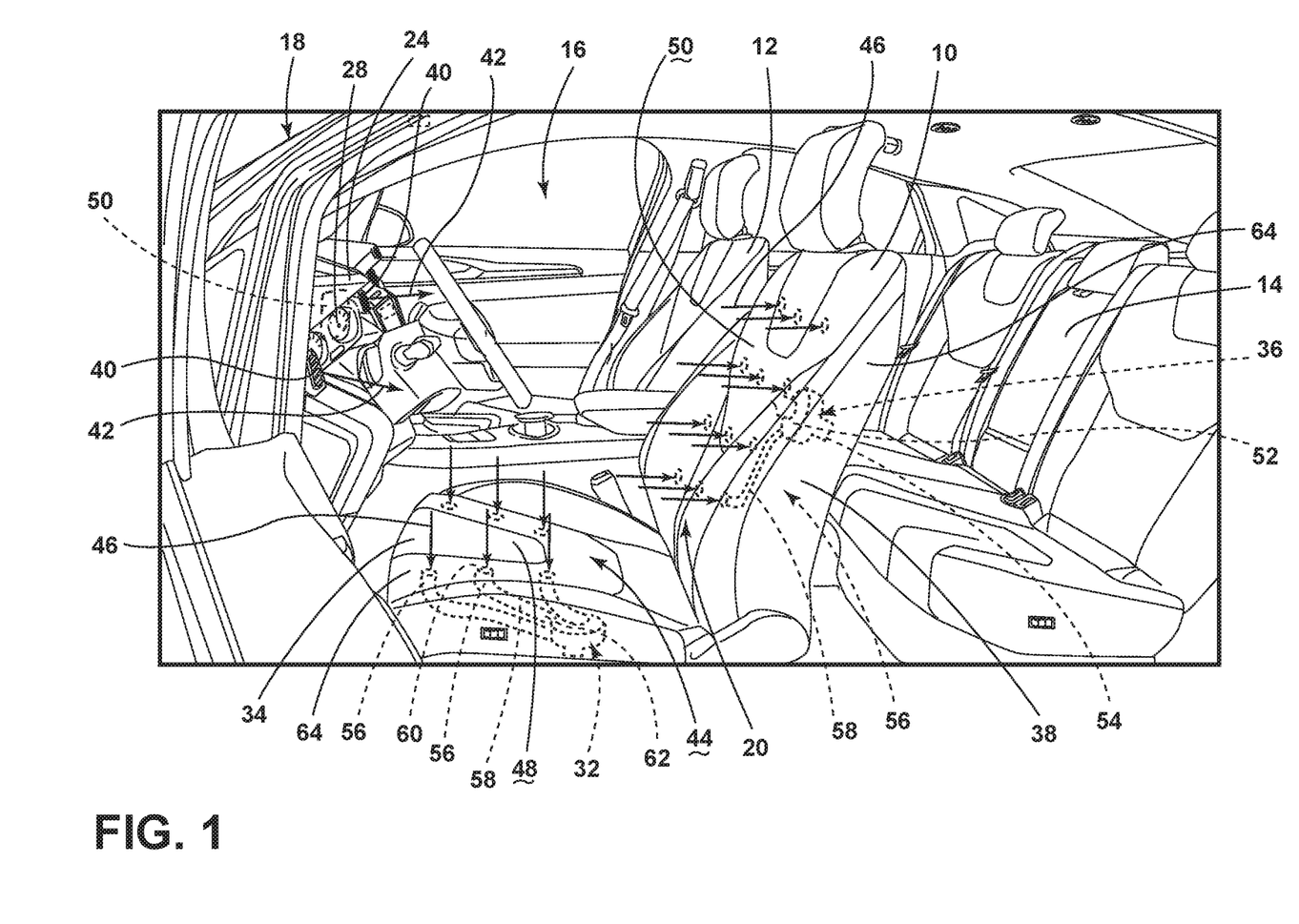
FIG. 1 is a side perspective view of a vehicle cabin with a seating assembly in a vehicle, according to an embodiment.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
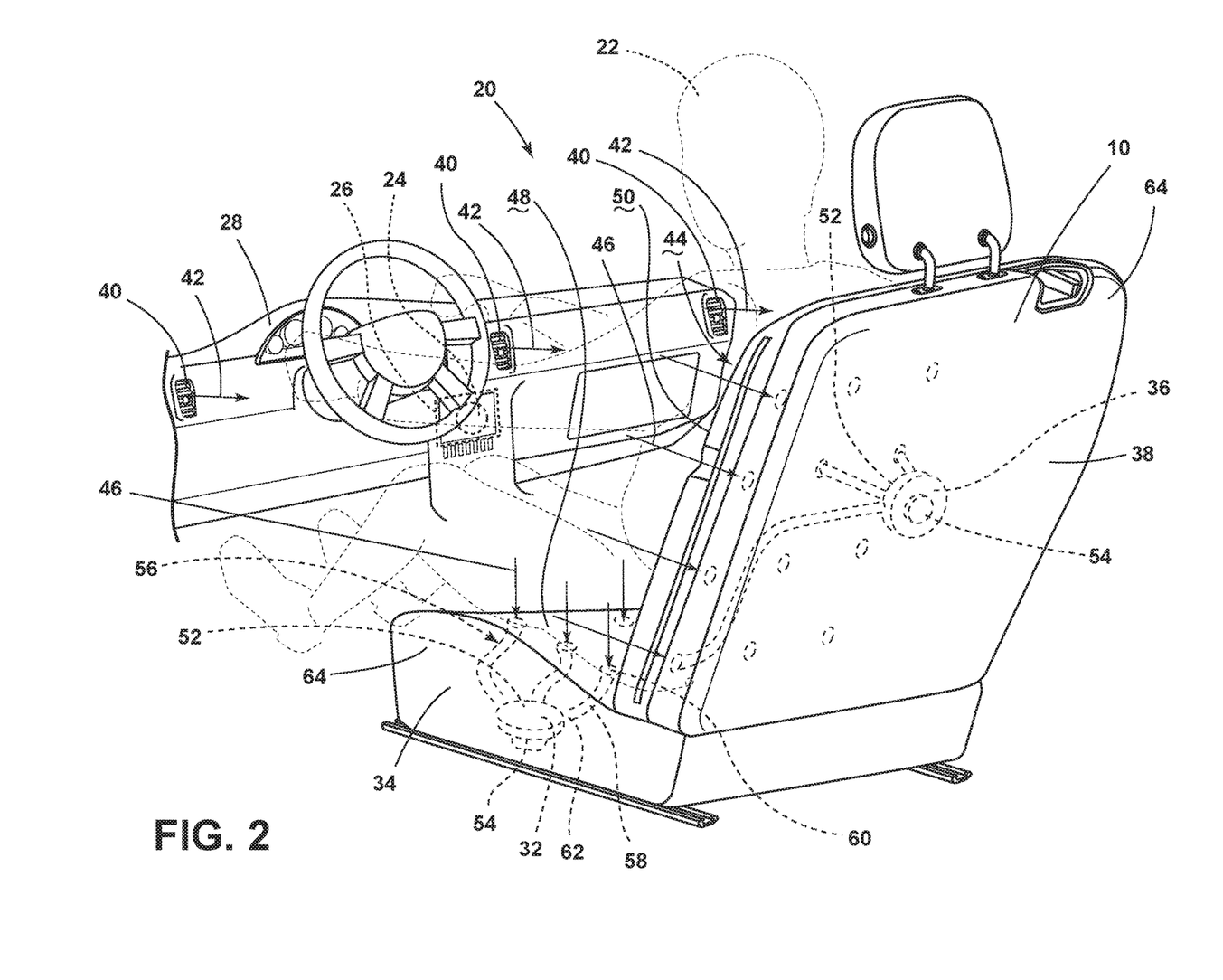
FIG. 2 is a side perspective view of a seating assembly, according to an embodiment.

Referring to FIGS. 1-2, a driver seating assembly 10, a passenger seating assembly 12, and a row of rear seats 14 in a passenger cabin 16 of a vehicle 18 are shown. A vehicle ventilation system 20 is also shown. The vehicle ventilation system 20 is selectively operable to cool an occupant 22 in the driver seating assembly 10. The vehicle ventilation system 20 includes a cabin blower 24 and a seat blower assembly 30. The cabin blower 24 may be part of a vehicle climate control system 26 such as an HVAC (Heating Ventilating and Air Conditioning) system. In the illustrated embodiment, the cabin blower 24 is disposed in the instrument panel 28. In various embodiments, the cabin blower 24 may be located in vehicle locations in addition to or instead of the instrument panel 28. In the illustrated embodiment, the seat blower assembly 30 is located in or proximate the seating assembly 10. The seat blower assembly 30 includes a seat bottom blower 32 disposed in the seat bottom 34 and a seatback blower 36 disposed in the seatback 38. In one operational setting of the vehicle ventilation system 20, the cabin blower 24 releases air into the cabin 16 through vents 40, as shown by arrows 42, while the seat bottom blower 32 and the seatback blower 36 pull air proximate a seating surface 44 and away from the occupant 22, as shown by arrows 46. The release of air into the cabin 16 by the cabin blower 24 and the pulling of air away from the occupant 22 by the seat blower assembly 30 cool the occupant. In various embodiments, the air that cools the occupant 22 may be conditioned (e.g. heated or cooled) air or ambient air.

Referring again to FIGS. 1-2, in various embodiments, the seat blower assembly 30 may include only a single blower that pulls air away from both the seat bottom surface 48 and the seatback surface 50. The seating surface 44 includes a seat bottom surface 48 and a seatback surface 50. The seat bottom blower 32 and the seatback blower 36 each include an air intake structure 52 and an air exhaust structure 54. The air intake structure 52 is disposed toward the seating surface 44, and the air exhaust structure 54 is disposed away from the seating surface 44. In one example, the seat blower assembly 30 pulls air away from the seating surface 44 through one or more airways 56. In one example, the one or more airways 56 include channels 58. Each channel 58 includes a first end 60 disposed at a seating surface 44 and a second end 62 coupled to a seat bottom blower 32. Air shown by arrows 46 is pulled into channels 58 and away from the seating surface 44 by seat bottom blower 32 and seatback blower 36 to cool an occupant 22.

Figure 2A:
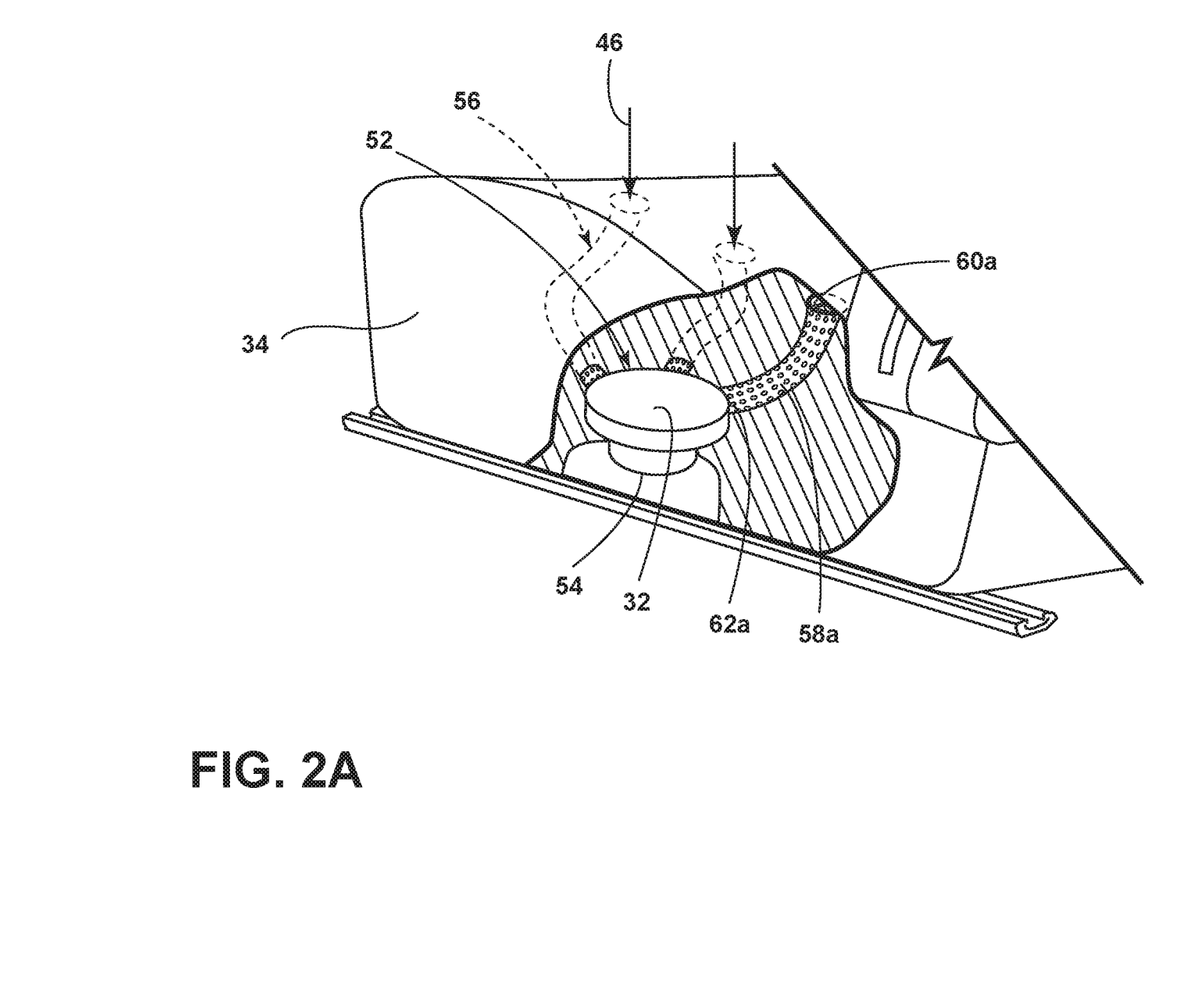
FIG. 2A is an exploded cutaway view of a portion of the seating assembly of FIG. 2, according to an embodiment.

With reference to FIG. 2A, the one or more airways 56 may include porous portions 58a in the cushion 64. The porous portions 58a may include a first end 60a disposed at a seating surface 44 and a second end 62a coupled to a seat bottom blower 32.

In certain conditions, when temperature and atmospheric conditions are outside of a comfort range for an occupant, a seating assembly 10 and a cabin 16 may be uncomfortably warm, such that the seating assembly 10 and the cabin 16 may not provide the occupant 22 with comfortable sitting in the vehicle 18. The occupant 22 may desire cooling airflows generated by the cabin blower 24 and the seat blower assembly 30, as shown by arrows 42 and 46, respectively. However, the comfort of the occupant 22 may be affected by bothersome NVH (Noise Vibration Harshness) conditions in the vehicle cabin 16 that arise when the cabin blower 24 and the seat blower assembly 30 are not operated harmoniously. Specifically, when the seat blower assembly 30 is on a high setting and the cabin blower 24 is not at a high setting, then bothersome NVH conditions (including noise) discourage an occupant 22 from using the seat blower assembly 30 in the high setting. To achieve comfortable NVH parameter levels (including noise levels) in the vehicle cabin 16, the cabin blower 24 should operate at a high setting while the seat blower assembly 30 operates at a high setting.

Generally, fans, blowers or other air movers may cause undesired NVH conditions in a vehicle cabin during operation. It is desirable to design the operation of fans, blowers, or other air movers in a vehicle cabin to reduce NVH conditions while achieving occupant 22 comfort.

By way of example, the vehicle control panel 72 is configured to implement the following settings:

TABLE 1

| Cabin Blower | Seat Blower |
| --- | --- |
| >Level 4 (High) | High Level |
| ≤Level 4 (Low) | Low Level |

The settings in Table 1 illustrate that the seat blower 30 (also referred to as seat blower assembly 30) may be operated at the high level when the cabin blower is operated at a high level. With reference to Table 1, Level 4 may be referred to as a predetermined level. The predetermined level is the level above which the cabin blower 24 works at a high enough level to trigger activation of the seat blower 30 at a high level. As previously stated, in various embodiments, when the cabin blower 24 and the seat blower 30 are operating at the high level, then the NVH noise caused by the seat blower 30 is drowned out by the cabin blower 24. That is, in situations where an occupant 22 desires rapid cooling of the seating surface 44 with minimal cabin NVH, the cabin blower 24 is set above a predetermined cabin blower level (Level 4 in Table 1) and the seat blower 30 is set above a predetermined seat blower level. When the cabin blower 24 and the seat blower 30 are both operating above their respective predetermined cabin blower and predetermined seat blower levels, then the decibel levels of the cabin blower 24 cancel the decibel levels of the seat blower 30. In various embodiments, the predetermined cabin and seat blower levels may be defined by a fan speed, a volumetric flowrate, a voltage suppled to the blower, or a similar parameter.

Referring to FIGS. 1-6, a vehicle ventilation system 20 includes a seating assembly 10 including a seat blower 30. The seat blower 30 pulls air away from a seating surface 44. The vehicle ventilation system 20 also includes a cabin blower 24 configured to circulate air in the passenger cabin 16. The vehicle ventilation system 20 further includes a controller 80 configured to monitor a volumetric flow rate of the cabin blower 24 and control a seat blower 30 volumetric flow rate as a function of the cabin blower 24 volumetric flow rate. In various embodiments, the seat blower 30 cools the seating surface 44. In various embodiments, the cabin blower 24 cools at least a portion of the cabin 16. In various embodiments, the cabin blower 24 cools the seating surface 44. In various embodiments, the seat blower 30, the cabin blower 24, or both the seat and the cabin blowers 30, 24 heat the seating surface 44.

In various embodiments, the cabin blower 24 is selectively and alternatively operable within a first range of cabin blower volumetric flowrates or a second range of cabin blower volumetric flowrates. The second range of cabin blower volumetric flow rates is higher than the first range of cabin blower volumetric flow rates. In various embodiments, the seat blower 30 is selectively and alternatively operable in a first range of seat blower volumetric flowrates or a second range of seat blower volumetric flowrates. The seat blower volumetric flow rates in the second range are higher than the seat blower volumetric flow rates in the first range. By way of example and with reference to Table 1, Table 2 shows settings of the vehicle ventilation system 20:

TABLE 2

| Cabin Blower | Seat Blower |
| --- | --- |
| >Level 4 (High Level - Second Range of Flowrates) | High Level - Second Range of Flowrates |
| ≤Level 4 (Low Level - First Range of Flowrates) | Low Level - First Range of Flowrates |

Figure 3:
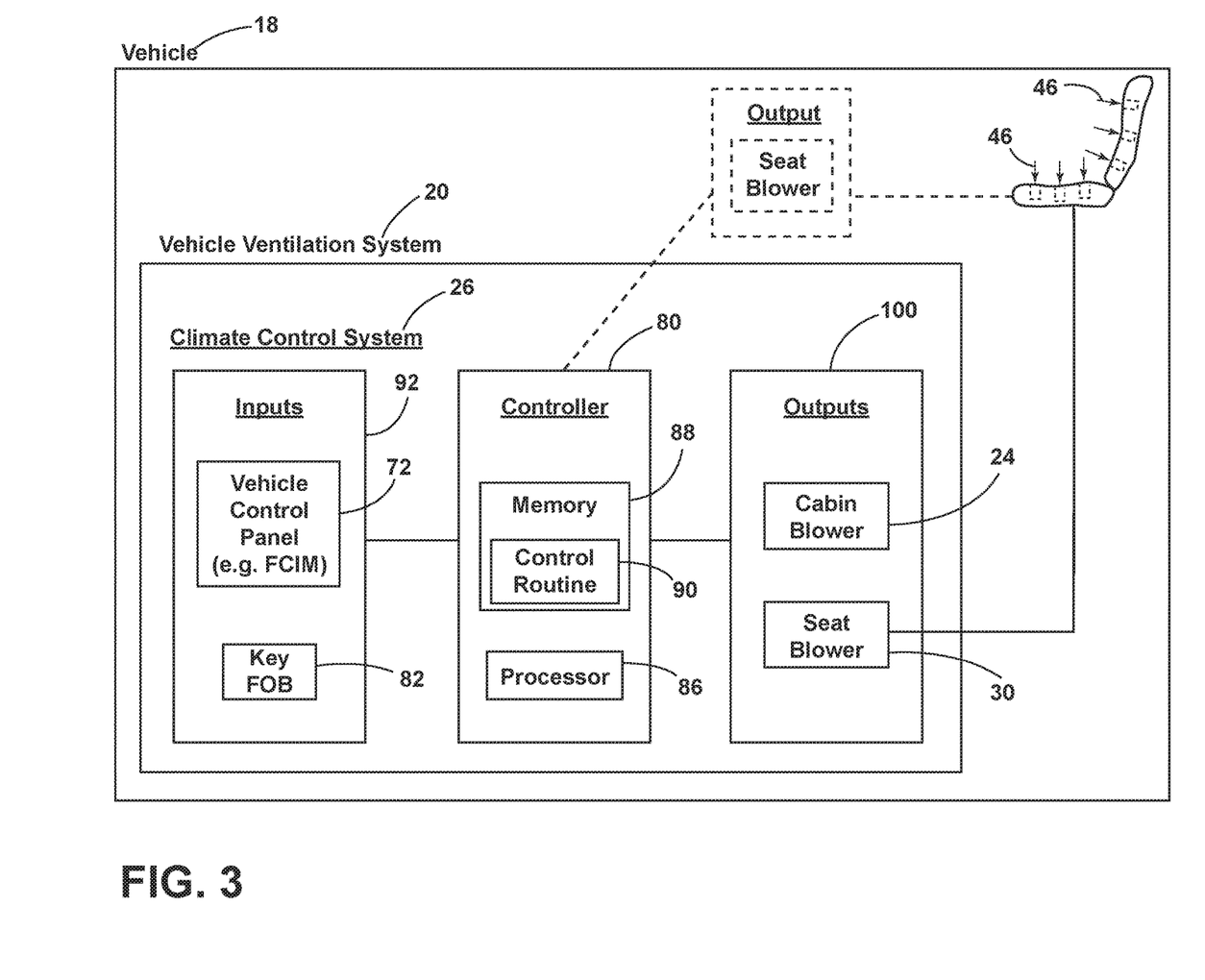
FIG. 3 is a schematic block diagram of a vehicle climate control system, according to an embodiment.

Referring to FIG. 3, a block diagram of the vehicle 18 is shown including the vehicle ventilation system 20 and the climate control system 26. The vehicle 18 includes a vehicle control panel 72 (e.g. FCIM) and a key fob 82. The vehicle control panel 72 (e.g. FCIM) is in communication with the controller 80. The controller 80 may also receive an input from a key fob 82. The controller 80 may include a processor 86 and a memory 88 for executing stored routines or for storing information (e.g., related to the operation of the vehicle inputs 92). In the depicted embodiment, the memory 88 of the controller 80 includes one or more control routines 90. In various embodiments, the controller 80 is a standalone device that is not in communication with body control modules, electronic control modules, engine control modules and/or other features of the vehicle 18. In various embodiments, the controller 80 can be any type of control circuitry. In the depicted embodiment, the controller 80 is in communication with vehicle inputs 92 that may be used in conjunction with the controller 80 and may communicate with the controller 80 thorough a multiplex communication bus (e.g., Lin, Can, etc.).

Figure 4:
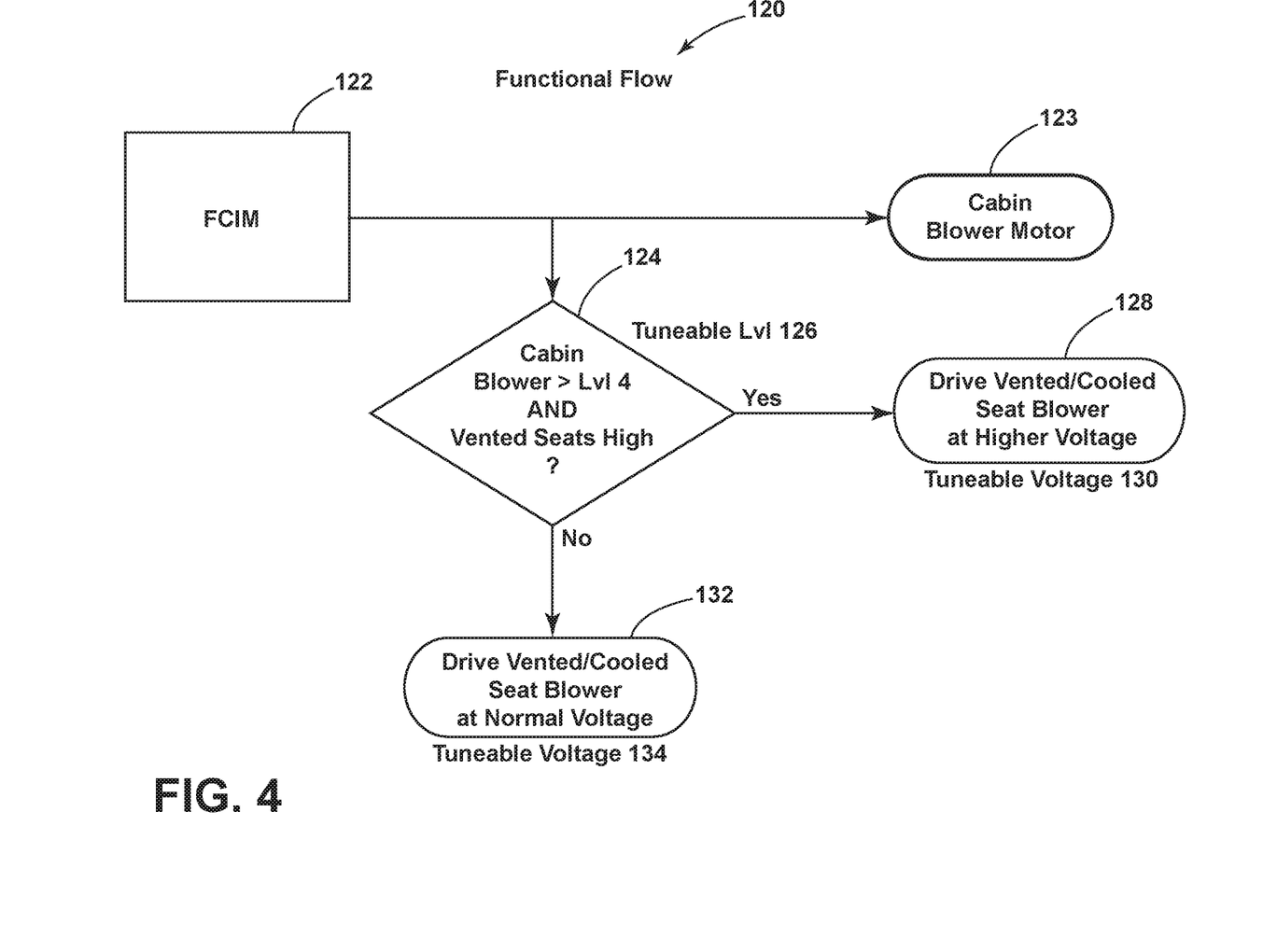
FIG. 4 is a flow diagram of a control routine in a memory of a controller of the vehicle climate control system of FIG. 3, according to an embodiment.

The controller 80 may selectively activate one or more outputs 100 in response to a vehicle input 92. In the depicted embodiment, the vehicle outputs 100 include a cabin blower 24 and a seat blower 30. In various embodiments, the seat blower 30 output may be part of the climate control system 26 or the vehicle ventilation system 20. The control routine 90 may include a Functional Flow portion 120 (FIG. 4). The seat blower 30 causes air to move from the seating surface 44 to the seat blower 30, as shown by arrows 46.

Referring again to FIGS. 1-6, in various embodiments, the vehicle ventilation system 20 may include a seat (seating assembly 10) having a seating surface 44, and a seat blower 30 configured to draw air away from the seating surface 44 to cool the seating surface 44 by moving the air. The vehicle ventilation system 20 may also include a cabin blower 24 configured to circulate air in a vehicle interior (vehicle cabin 16). The vehicle ventilation system 20 may further include a controller 80 configured to monitor a flow rate of the cabin blower 24 and control a seat blower 30 flow rate as a function of the cabin blower 24 flow rate. In the vehicle ventilation system 20, the seat blower 30 is disposed within a seat (seating assembly 10). The seat (seating assembly 10) includes a cushion 64. The cushion 64 includes one or more airways 56 that deliver air from the seating surface 44 to the seat blower 30.

Referring to FIG. 4, a Functional Flow portion 120 of a control routine 90 that may be stored as software in memory 88 of the controller 80 of FIG. 3 is shown, according to one embodiment. In step 122, the FCIM provides an input to the Cabin Blower Motor 123 and performs a query at step 124. In step 124, the level of the cabin blower 24 is determined and the level of the seat blower 30 is determined. In decision step 124, the routine 90 determines whether the Cabin Blower is greater than a value of Lvl 4 and whether the Vented Seats are operating in the High vent setting. The level of the air blower at step 124 is tuneable. Element 126 identifies the Tuneable Lvl at step 124. The level (Lvl) may be set at various predetermined levels. If the decision of step 124 is affirmative, then the Drive Vented/Cooled Seat Blower is activated at a Higher Voltage at step 128. The higher voltage may be achieved with a tuneable voltage 130 at step 128, which is determinative of the blower output. Element 130 identifies the Tuneable Voltage at step 128. The voltage may be set at various predetermined levels. If the decision at step 124 is negative, then routine 120 proceeds to step 132 to activate the Drive Vented/Cooled Seat Blower at a Normal Voltage. This may be achieved using the Tuneable Voltage 134 at step 132.

Figure 5:
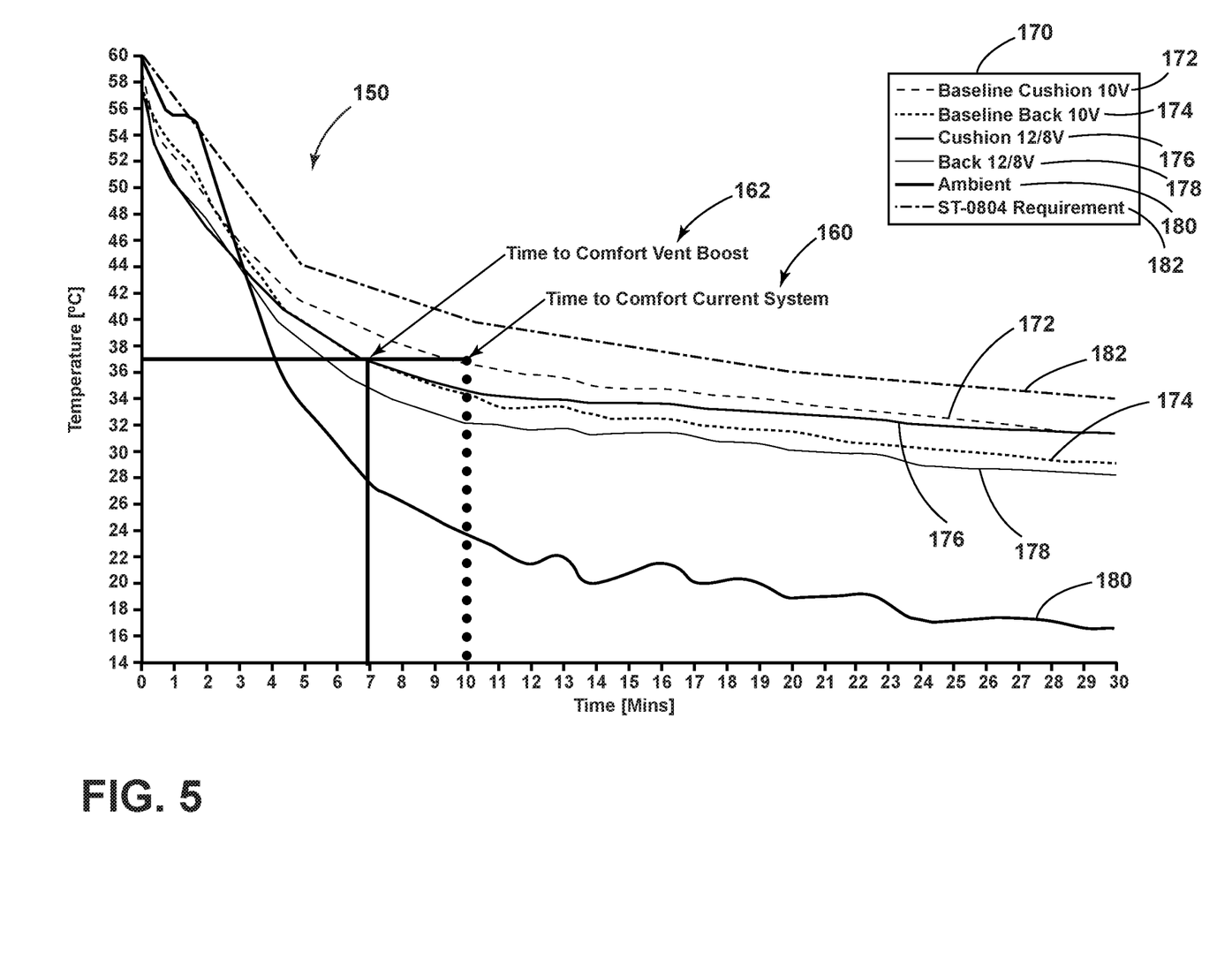
FIG. 5 is a graph showing examples of seating surface temperature change times of the present embodiment.

Referring to FIG. 5, a graph 150 shows the times to cool a seating surface using the vehicle ventilation system 20, according to one example. The Time to Comfort term refers to the seat vent activation time to achieve 37° C. seat surface temperature from 60° C. initial soak temperature, according to one example. Activation of the Vent Boost feature improves the time to comfort by 3 minutes. The Vent Boost feature represents the setting in which the cabin blower is >Level 4 (High) and the seat blower is at the high level such as is discussed with reference to Table 1. The graph 150 shows the time to cool a seating surface on the X-axis in units shown as minutes. The Y-axis shows the temperature in units as degrees Celsius. The Time to Comfort Current System indicates the time to cool a seating surface when the seat blower voltage is at or below the predetermined level. In this example, the Time to Comfort Vent Boost shows the time it takes to cool the seating surface to 37° C. when the seat blower voltage setting is above the predetermined level. Referring to the legend 170 and the graph 150, the Baseline Cushion 10 V (element 172) and the Baseline Back 10 V (element 174) cool from 60° C. to 37° C. in 10 minutes and 7 minutes, respectively. Referring again to the legend 170 and the graph 150, the Cushion 12/8 V (element 176) and the Back 12/8 V (element 178) cool from 60° C. to 37° C. in 7 minutes and approximately 6 minutes, respectively. The ambient 180 line shows the temperature change of the vehicle interior (Y-axis 156) against time (X-axis 152). The ST-0804 Requirement 182 shows the temperature change of the vehicle interior (Y-axis 156) against time (X-axis 152) based on the ST-0804 Requirement 182 (test specification). The Baseline Cushion 10 V (element 172) and the Baseline Back 10 V (element 174) operate at a lower fan speed (voltage) than the Cushion 12/8 V (element 176) and the Back 12/8 V (element 178). The designation "12/8 V" used in the terms Cushion 12/8 V (element 176) and the Back 12/8 V (element 178) refers to an initial voltage of 12 V that is decreased to a subsequent voltage of 8 V.

Figure 6:
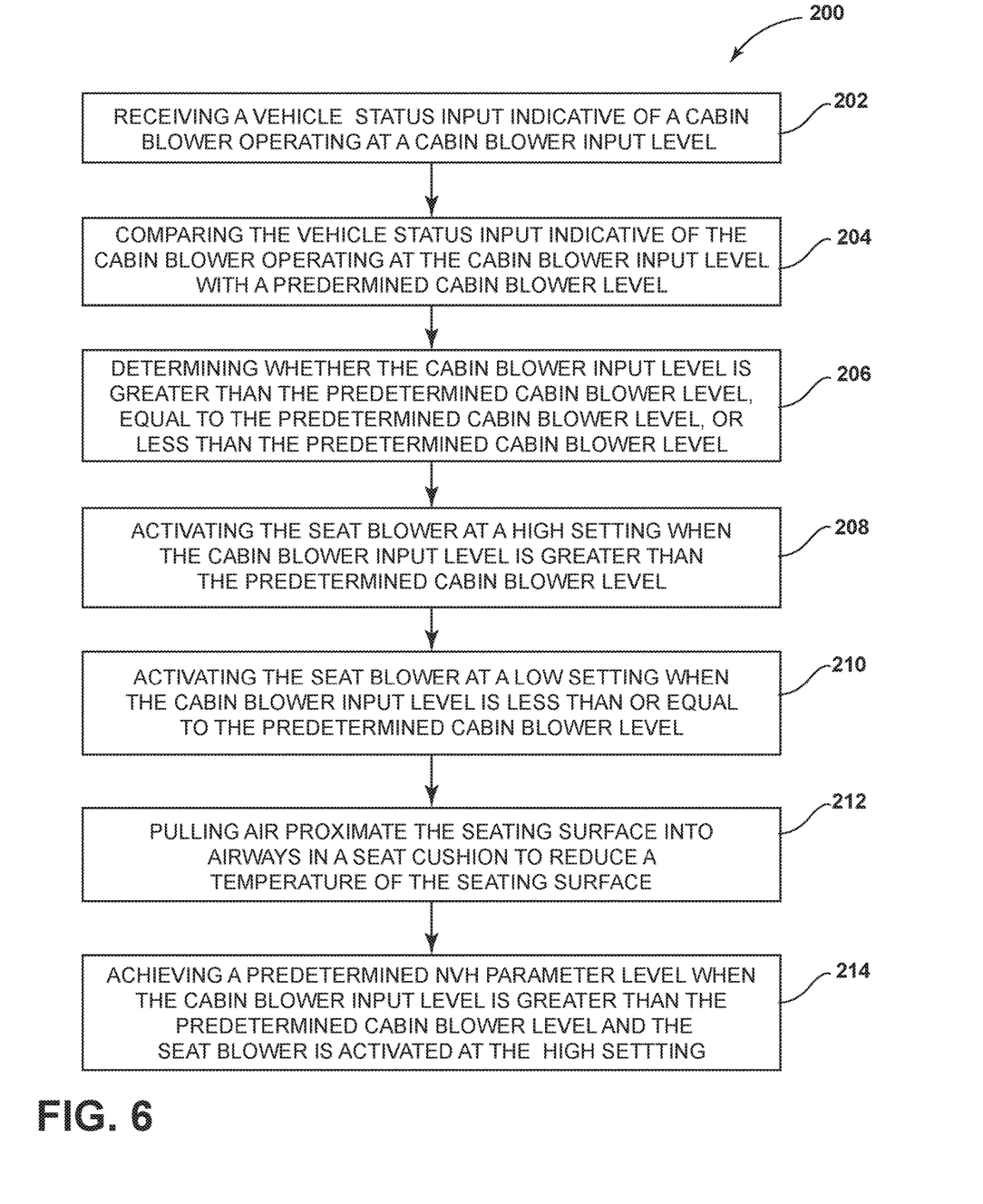
FIG. 6 is a flow diagram of a method for reducing a seating surface temperature.

Referring to FIG. 6, a flow chart shows a method 200 for reducing a seat surface temperature, according to one embodiment. In this embodiment, the method 200 includes the step 202 of receiving a vehicle status input indicative of a cabin blower operating at a cabin blower input level. The next step 204 includes comparing the vehicle status input indicative of the cabin blower operating at the cabin blower input level with a predetermined cabin blower level. The next step 206 includes determining whether the cabin blower input level is greater than the predetermined cabin blower level, equal to the predetermined cabin blower level, or less than the predetermined cabin blower level. Step 208 includes activating the seat blower at a high setting when the cabin blower input level is greater than the predetermined cabin blower level. Step 210 includes activating the seat blower at a low setting when the cabin blower input level is less than or equal to the predetermined cabin blower level. Next, step 212 includes pulling air proximate the seating surface into airways in a seat cushion to reduce a temperature of the seating surface. Step 214 includes achieving a predetermined NVH parameter level when the cabin blower input level is greater than the predetermined cabin blower level and the seat blower is activated at the high setting.

In various embodiments, the seat blower assembly 30 (also referred to as the seat blower 30) may be an air mover. In various embodiments, the cabin blower 24 may be an air mover.

A variety of advantages may be derived from the use of the present disclosure. The seat ventilation system may be advantageously used on any vehicle seat. Seat ventilation blowers operating at a maximum speed (RPM (Revolutions Per Minute)) exceed vehicle interior noise targets. Because seat ventilation blowers operating at a maximum speed (RPM) exceed vehicle interior noise targets, the seat ventilation blower operation is reduced to a lower speed resulting in lower airflow and reduced cooling performance in order to meet NVH requirements. When the main climate fan (i.e., cabin blower) is operating at a high enough drive voltage level, then the noise of the seat ventilation blower operating in the Boost Mode (i.e., high level or Vent Boost setting) is not noticeable to passengers. The ventilated seat Boost Mode allows preconditioning during the remote start and anytime the cooled/ventilated seats are engaged. The ventilated seat Boost Mode also allows coordination with a vehicle HVAC blower (i.e., cabin blower) speed in order to provide better performance without noticeable seat noise associated with increased RPMs of the seat blower. Initial seat cool down performance is key to occupant comfort. The Vent Boost feature improves the time to comfort of the seating surface temperature by three minutes.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or number of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle ventilation system, comprising:
   a seating assembly including a seat and a seat blower, wherein the seat blower pulls air away from a seating surface, and wherein the seat blower is disposed within the seat;
   a cushion coupled to the seat;
   at least one airway disposed within the cushion, wherein the at least one airway includes at least one channel and at least one airway wall that is proximate the cushion and coupled to the cushion, wherein the at least one channel is configured to deliver air from the seating surface to the seat blower, and wherein the at least one airway wall comprises at least one porous portion, and wherein the at least one porous portion is defined along a first end of the at least one airway wall that is disposed at the seating surface and a second end of the at least one airway wall that is coupled to the seat blower;
   a cabin blower configured to circulate air in a cabin; and
   a controller configured to:
   monitor a flow rate of the cabin blower; and
   control a seat blower flow rate as a function of a cabin blower flow rate.

2. The vehicle ventilation system of claim 1, wherein the seat blower cools the seating surface.

3. The vehicle ventilation system of claim 2, wherein the cabin blower cools at least a portion of the cabin.

4. The vehicle ventilation system of claim 3, wherein the cabin blower cools the seating surface.

5. The vehicle ventilation system of claim 4, wherein the seat blower pulls air away from the seating surface through the at least one channel in a seat cushion.

6. The vehicle ventilation system of claim 5, further comprising:
   a first vehicle input in communication with the controller, wherein the controller is configured to selectively activate the cabin blower within a first range of cabin blower flow rates or a second range of cabin blower flow rates.

7. The vehicle ventilation system of claim 6, wherein when the cabin blower is activated within the first or second range of the cabin blower flow rates, then the controller is configured to activate the seat blower within a corresponding and respective first or second range of seat blower flow rates.

8. The vehicle ventilation system of claim 7, wherein the cabin blower flow rates in the second range of cabin blower flow rates are higher than the cabin blower flow rates in the first range of cabin blower flow rates and wherein the seat blower flow rates in the second range of seat blower flow rates are higher than the seat blower flow rates in the first range of seat blower flow rates.

9. The vehicle ventilation system of claim 8, wherein the controller is configured to activate the seat blower in response to a manual input.

10. The vehicle ventilation system of claim 1, further comprising a first air exhaust coupled to the seat bottom blower and a second air exhaust coupled to the seat back blower.

11. The vehicle ventilation system of claim 10, wherein the first air exhaust is distal and generally perpendicular from the second air exhaust.

12. A vehicle ventilation system, comprising:
    a seat having a seating surface;
    a cushion coupled to the seat;
    a seat air mover configured to draw air away from the seating surface to cool the seating surface, the seat air mover further comprising a seat bottom blower disposed in a bottom portion of the seat and a seat back blower disposed in a seat back portion of the seat;
    a first plurality of airways disposed within the cushion, the first plurality of airways including a first plurality of channels that are configured to deliver the air from the seating surface to the seat bottom blower and a first plurality of airway walls, wherein the first plurality of airway walls are proximate the cushion and coupled to the cushion, and wherein the first plurality of airway walls further comprise a plurality of porous portions that are defined along a first end of the first plurality of airway walls that is disposed at the seating surface and a second end of the first plurality of airway walls that is coupled to the seat bottom blower;
    a second plurality of airways disposed within the seat back portion, the second plurality of airways includes a second plurality of channels that are configured to deliver the air from the seating surface to the seat back blower;
    a cabin air mover configured to circulate air in a vehicle interior; and
    a controller configured to:
    monitor a flow rate of the cabin air mover; and
    control a seat air mover flow rate as a function of a cabin air mover flow rate.

13. The vehicle ventilation system of claim 12, wherein when the cabin air mover is in a cabin air mover high setting, then the controller activates the seat air mover at a seat air mover high setting.

14. The vehicle ventilation system of claim 13, wherein the cabin air mover high setting and the seat air mover high setting each include a predefined range of volumetric flow rates.

15. The vehicle ventilation system of claim 12, wherein when a cabin air mover volumetric flow rate is at or above a predetermined cabin air mover volumetric flow rate level and a seat air mover volumetric flow rate is at or above a predetermined seat blower volumetric flow rate level, then a predetermined NVH parameter level is achieved in the vehicle interior.

16. The vehicle ventilation system of claim 15, wherein the predetermined NVH parameter level includes a noise level.

17. The vehicle ventilation system of claim 12, wherein the second plurality of channels further comprise a first end of the second plurality of channels that is disposed at the seating surface and a second end of the second plurality of channels that is coupled to the seat back blower.

* * * * *